United States Patent [19]

Le

[11] Patent Number: 5,114,158
[45] Date of Patent: May 19, 1992

[54] PACKING ASSEMBLY FOR OILFIELD EQUIPMENT AND METHOD

[76] Inventor: Tri C. Le, 3543 Santa Rosa La., Sugar Land, Tex. 77478

[21] Appl. No.: 615,585

[22] Filed: Nov. 19, 1990

[51] Int. Cl.$^5$ .................. F16J 15/06; F16L 19/06; E21B 33/04
[52] U.S. Cl. .............................. 277/1; 166/88; 166/89; 166/387; 277/117; 277/119; 277/124; 285/142; 285/147; 285/341
[58] Field of Search ............... 277/1, 118, 117, 123, 277/125, 102, 112, 190, 116.4, 116.6, 116.8, 115, 9.5, 11, 101, 103, 119, 124; 166/88, 89, 387; 285/142, 147, 339, 341, 342

[56] References Cited

U.S. PATENT DOCUMENTS

| | | | |
|---|---|---|---|
| 412,874 | 10/1889 | Chaddock | 277/117 |
| 1,163,941 | 12/1915 | Miller | 277/103 X |
| 1,976,238 | 10/1934 | Long et al. | 166/89 |
| 2,589,483 | 3/1952 | Eckel et al. | 285/147 |
| 2,591,142 | 4/1952 | Eckel | 285/142 |
| 2,824,757 | 2/1958 | Rhodes | 285/147 X |
| 3,350,104 | 10/1967 | Hynes | 277/9 |
| 3,653,671 | 4/1972 | Shipes | 166/88 X |
| 3,895,831 | 7/1975 | Fisher | 277/117 X |
| 4,291,768 | 9/1981 | Diehl | 166/387 X |
| 4,489,916 | 12/1984 | Stevens | 277/117 X |
| 4,552,213 | 11/1985 | Boyd et al. | 166/387 X |
| 4,556,224 | 12/1985 | Le | 277/118 |
| 4,645,214 | 2/1987 | Copley | 277/112 |
| 4,718,679 | 1/1988 | Vyvial | 277/112 |

FOREIGN PATENT DOCUMENTS 134535 3/1916 Fed. Rep. of Germany ...... 277/117

OTHER PUBLICATIONS

Brochure entitled "W-K-M HSC-1 Hydraulic Set Connector"–4–page brochure by Cooper Industries (1989).

*Primary Examiner*—Allan N. Shoap
*Attorney, Agent, or Firm*—Browning, Bushman, Anderson & Brookhart

[57] ABSTRACT

An improved packing assembly is provided for forming a metal-to-metal sealing engagement between an outer cylindrical surface and an inner cylindrical surface within downhole or surface hydrocarbon recovery equipment having an axially extending flow path therein. The packing assembly includes an outer seal ring and a inner seal ring with upper and lower tapered surfaces, an upper energizing ring and a lower energizing ring each having tapered surfaces for sliding engagement with a tapered surface of the seal rings, and an interconnection member for limiting axial movement of the energizing rings. Projections on each of the seals rings are preferably provided for obtaining substantially line contact sealing engagement with the respective cylindrical surface, and each of these projections is spaced radially opposite and at substantially the same axial depth as a tapered surface on a respective upper or lower energizing ring, such that each of the projections is forced radially into sealing engagement with the corresponding cylindrical surface by a substantially equal force. According to the method of the present invention, the entire assembly is formed and may be lowered downhole to minimize installation costs, and the energizing rings thereafter moved axially together by the application of mechanical or hydraulic force to set the sealing assembly.

19 Claims, 2 Drawing Sheets

PACKING ASSEMBLY FOR OILFIELD EQUIPMENT AND METHOD

BACKGROUND OF THE INVENTION

1. Field of the Invention

The present invention relates to a seal or packing assembly for sealing the annulus between an outer cylindrical surface of one member and an inner cylindrical surface of another member, with at least one member having a through bore for passing fluid through the member. More particularly, the present invention relates to a mechanically or hydraulically set packing assembly for a crossover seal assembly, a tubing hanger, a subsea wellhead, a surface wellhead or christmas tree, or similar downhole or surface equipment used in hydrocarbon recovery operations and having a flow path therein for receiving a tubular member to recover formation fluids.

2. Description of the Background

Various downhole and wellhead equipment having an internal flow path for transmitting formation fluids requires a packing assembly for reliably sealing the annulus between an outer cylindrical surface provided by the equipment and an inner cylindrical surface provided by a casing or tubing string positioned within the equipment. Such a packing assembly is used, for example, in a crossover seal assembly to seal the upper end of a casing with a casing head having a central bore defining an outer sealing surface, and thus provides a seal between the casing and the casing head.

A packing assembly may be used within a wellhead located at the surface, but also is frequently used in downhole equipment which may be spaced hundreds of meters below the surface where installation and repair are both difficult and expensive. Most prior art packing assemblies used in wellheads and downhole equipment have required that the cylindrical surfaces which will be in sealing engagement with the packing assembly be specially machined to obtain the desired surface finish and machine tolerances required for a reliable seal. Packing assemblies traditionally have used various elastomeric materials to form the seal with these machined surfaces, and improvements in elastomeric materials have increased the reliability of such sealing assemblies under some conditions. Exemplary sealing assemblies with rubber or elastomeric sealing components are depicted in U.S. Pat. Nos. 2,589,483 and 2,591,142.

Packing assemblies with elastomeric seals have at least two significant drawbacks which have limited their acceptance in the hydrocarbon recovery industry: (1) for the elastomeric seal to be effective, the metal surfaces which the seal engages typically must be specially machined, thereby reducing the versatility of field operations and increasing costs, and (2) such seals are susceptible to significant deterioration or total destruction at elevated temperatures caused by fires or other high temperature environments. Since such packing assemblies should reliably seal when subjected to fluid pressures in excess of five thousand PSI and since such packing assemblies are commonly critical in the event of a fire or other emergency situation, these limitations frequently lead the production operator to require a packing assembly which will form a metal-to-metal seal and thereby overcome these limitations.

One type of packing assembly with seals for metal-to-metal engagement with the inner and outer cylindrical surfaces is offered by WKM in Houston, Texas and is designated as a CANH seal. This type of packing assembly overcomes the undesirable features of a seal with elastomeric components, i.e., it does not require machined surfaces for reliable sealing engagement, and is not susceptible to immediate deterioration in a fire. Nevertheless, this sealing assembly has other drawbacks which have limited its acceptance in the hydrocarbon recovery industry. The packing assembly comprises separate upper and lower seals with mating surfaces. Each seal is individually placed into position for service, so that multiple "trips" are necessary to position the packing assembly in a downhole environment. Since two sets of packing assemblies each having upper and lower seal rings are frequently utilized, these multiple trips increase the installation costs and undesirable downtime. Moreover, each set of upper and lower seals preferably is provided with top and bottom protruding portions for forming substantially line contact sealing edges with the corresponding cylindrical surface. The design of the packing assembly does not result, however, in substantially equal radial pressure being applied to each of these sealing edges, thus reducing the reliability of the seal. The WKM crossover packing assembly is more fully described in U.S. Pat. No. 4,556,224.

The disadvantages of the prior art are overcome the present invention, and an improved packing assembly suitable for use with various downhole or wellhead equipment is hereinafter provided, along with an improved method for positioning the packing assembly in place and thereafter setting the packing assembly.

SUMMARY OF THE INVENTION

The packing assembly of the present invention provides a metal-to-metal seal for reliably sealing the annulus between an inner cylindrical surface provided by a flow conduit and a concentric outer cylindrical surface provided by various oilfield equipment having a central flow path therein, such as crossover equipment, tubing hangers, wellhead, etc. When used in a typical crossover assembly, the packing assembly provides a reliable seal between the outer cylindrical surface of a well casing head and the inner cylindrical surface of a casing within the casing head. The packing assembly may be replaced in an existing well bore with a single trip, and the packing assembly may be either mechanically or hydraulically set in a variety of downhole or wellhead equipment designs.

In one embodiment, the packing assembly comprises an inner seal ring and an outer seal ring for respective sealing engagement with the inner and outer cylindrical surfaces of the interior tubular member and the equipment. An upper energizing ring and a lower energizing ring are each mechanically interconnected, and each ring has an inner and outer tapered surface for sliding engagement with a mating surface provided on the inner and outer seal ring, respectively. As force is applied to drive the upper and lower rings axially together, the tapered surfaces cause the sealing rings to expand or contract into metal-to-metal engagement with the cylindrical surfaces. Since the seal rings are each fixed between the upper and lower energizing rings, which in turn are mechanically connected together, the entire packing assembly may be installed downhole in a single trip, thus substantially reducing the installation cost and downtime. Each sealing ring preferably includes an upper and a lower projection for obtaining substantially line contact sealing engagement with the corresponding cylindrical surface. The energizing rings are configured such that a tapered surface on an energizing ring will continually be axially aligned with each projection on each sealing member. This feature results in substantial equal radial force being applied to each of the upper and lower projections, thereby enhancing sealing reliability.

The packing assembly of a present invention is able to obtain reliable metal-to-metal sealing with cylindrical surfaces which are not machined or otherwise specially prepared for sealing engagement with the packing assembly. A hold down lock screw or similar device may be used to both fix the packing assembly in place within the downhole or wellhead equipment, and to move the energizing rings axially together and thereby activate the packing assembly into sealing engagement. During periodic service or repair of the downhole or wellhead equipment, the entire packing assembly may be easily replaced as a unit and a new assembly installed.

It is an object of the present invention to provide an improved sealing or packing assembly for downhole or wellhead equipment which obtains a reliable metal-to-metal seal between outer and inner cylindrical surfaces.

It is also an object of this invention to provide a packing assembly which can be easily and quickly installed in downhole equipment.

Yet another object of the invention is an improved packing assembly which reliably forms multiple substantially line contact seals with each inner and outer cylindrical surface.

It is a feature of this invention that the packing assembly comprises an inner seal ring and an outer seal ring each structurally secured between an upper and a lower energizing ring, which in turn are mechanically interconnected yet axially moveable with respect to each other.

Another feature of the invention is that the seal rings are each provided with upper and lower projections for obtaining substantially line contact engagement with a cylindrical surface, and that the tapered surface of a corresponding energizing ring is axially aligned with each projection when the packing assembly is set.

A further feature of this invention is that the packing assembly may be used in various types of downhole or wellhead equipment. The inner and outer sealing rings may be axially aligned, such that the required axial length of the inner and outer cylindrical surfaces on the equipment is minimized.

It is an advantage of the invention that the packing assembly may be mechanically of hydraulically set utilizing conventional setting equipment and techniques.

It is a further advantage of this invention that the packing assembly may be repeatedly locked into the set position and thereafter released for subsequent service.

Still another advantage of the invention is that two or more axially spaced packing assemblies may be used in various equipment for sealing redundancy.

These and further objects, features, and advantages of the present invention will become apparent from the following detailed description, wherein reference is made to figures in the accompanying drawings.

DETAILED DESCRIPTION OF PREFERRED EMBODIMENTS

The present invention is directed to metal-to-metal seal assembly, commonly referred to as a packing assembly, for downhole or surface equipment, to a hydrocarbon recovery assembly (such as a downhole tubing hanger or a surface wellhead assembly) including a packing assembly according to the present invention, and to improved methods for forming, positioning and setting a packing assembly in downhole equipment. The packing assembly seals between an outer cylindrical surface conventionally provided in such equipment, and an inner cylindrical surface provided on a tubular member which is concentrically aligned with the outer cylindrical surface and passes at least partially through the equipment. The invention is described below in detail with respect to a packing assembly in surface wellhead equipment, although the invention has significant advantages when utilized with a subsea wellhead, tubing hanger or other downhole equipment in a well bore. Such downhole equipment is typically located hundreds of meters below the surface, and the packing assembly of the present invention offers reduced installation costs and high reliability compared to prior art devices. The term hydrocarbon recovery assembly, as used herein, is thus intended to include various types of surface or downhole equipment, including surface wellhead or christmas trees, casing cap-off equipment, subsurface wellheads, downhole tubing or casing hangers, and crossover seal assemblies.

The outer cylindrical surface on the equipment typically defines a flow path for receiving a tubular member which may pass through the equipment. The packing assembly seals the annulus between the equipment and the tubular member so that fluid in this annulus is directed to outside the equipment. The tubular member may be a casing or tubing, which in turn transmits downhole fluid to a location above the packing assembly, where it subsequently may be diverted to another flow line. The cylindrical sealing surface on the equipment is referred to herein as an outer surface, since it is radially outward of the ring-shaped sealing or packing assembly, although with respect to the equipment itself it is an inner surface. Similarly, the inner sealing surface on a tubular member is radially inward of the sealing assembly, although it is the outer cylindrical surface of the casing, tubing, or other flow conduit passing through the equipment. A significant advantage of present invention is that the outer cylindrical surface of the equipment and the inner cylindrical surface of the flow conduit need not be specially machined, since the sealing assembly provides a highly reliable metal-to-metal seal with these cylindrical surfaces, rather than a elastomeric-to-metal seal.

Figure 1:
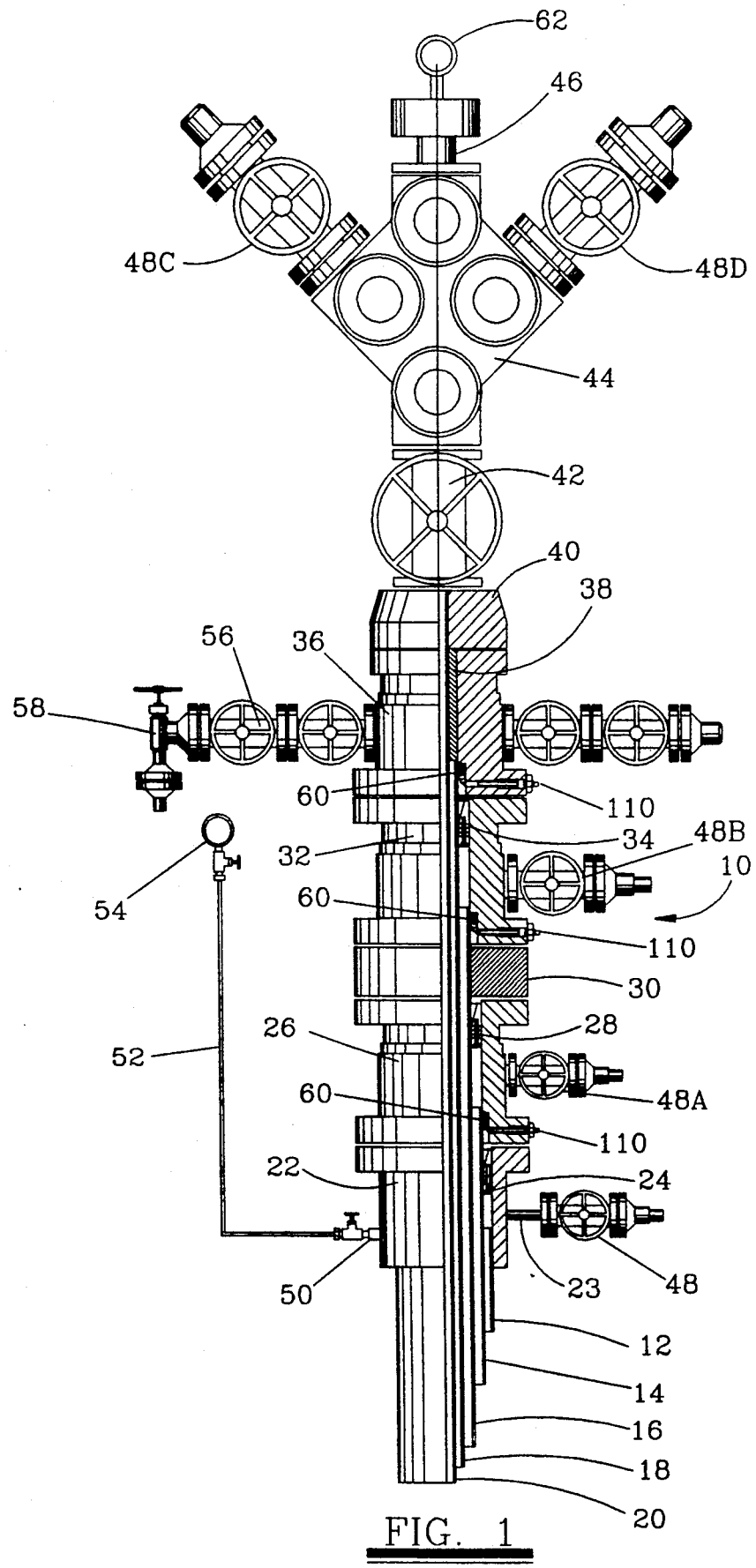
FIG. 1 is a simplified elevation view, partially in cross-section, of a wellhead assembly including multiple packing assemblies according to the present invention.

FIG. 1 generally depicts a wellhead or christmas tree assembly 10 used in hydrocarbon recovery operations. The upper end of an outer casing 12 may be welded or otherwise secured to a casing head 22, while an inner casing 14 concentrically positioned within casing 12 extends from the well bore through the casing head 22 and is secured thereto by a casing hanger or slip assembly 24. Nipple 23 extends from the casing head 22, and a gate valve 48 mounted by conventional companion flanges may be used to control fluid flow from the annulus between the outer casing 12 and the inner casing 14. The fluid pressure in this annulus may be controllably vented by gate valve 48 during hydrocarbon recovery operations. A needle valve 50 may be used to open tubing line 52 to the pressure in this annulus, so that gauge 54 or other sensing device may be used to monitor the pressure in the annulus between casings 12 and 14.

A conventional casing spool 26 is mounted above the casing head 22, and casing hanger 28 secures casing 16 concentrically positioned within casing 14 to the casing spool 26. Another gate valve 48A extends from the spool 26 to control fluid flow in the annulus between the casings 14 and 16, and a similar needle valve, tubing line, and pressure gauge (not shown in FIG. 1) may be used to monitor this pressure. A packing assembly 60 and a hold down lock screw 110 are generally depicted within the casing spool 26, and will be discussed in detail subsequently. For the present, however, it should be understood that the packing assembly seals the upper end of casing 14 to casings spool 26, so that any pressure within the annulus between the casings 12 and 14 must be vented through the gate valve 48. Although not shown in FIG. 1, those skilled in the art will appreciate that the casing spool 26 may be conventionally mounted to the casing head 22 by suitable bolts, and that appropriate ring gaskets or other seals prevent the escape of fluid from between the adjoining flanges of the various christmas tree components.

The casing 16 may extend through a conventional pack-off flange assembly 30, and the upper end of the casing 16 sealed to casing spool 32 by another packing assembly 60 and hold down lock screw 110 according to the present invention. Casing 18 extends through the casing spool 32 and is secured thereto by casing hanger 34, and yet another gate valve 48B controls the flow of fluid through the casing spool 32 and from the annulus between the casings 16 and 18. Another needle valve, small diameter tubing, and pressure gauge similar to the components shown in FIG. 1 again may be used to monitor the pressure in the annulus between casing 16 and 18.

A tubing spool 36 is mounted to the casing spool 32, and tubing hanger 38 secures the tubing 20 which is concentrically aligned with casing 18 to the tubing spool 36. The upper end of casing 18 is in sealing engagement with the tubing spool 36 by yet another packing assembly 60 and hold down lock screw 110 according to the present invention. A plurality of gate valves 56 extend from the tubing spool 36 for controlling fluid flow and high pressure in the annulus between casing 18 and tubing 20. A conventional adjustable choke 58 is also provided for controlling fluid pressure which passes through the gate valve 56.

An adapter 40 is mounted on top of the tubing spool 36, and gate valve 42 is mounted on the adapter for controlling fluid flow through the tubing 20. A block gate valve assembly 44 may be mounted on top of the gate valve 42. A pair of gate valves 48C and 48D are mounted on the block gate valve as shown. A tree cap 46 is mounted on the uppermost end of the block 44, and a gauge 62 is provided on the tree cap for monitoring fluid pressure in the tubing 20. Those skilled in the art will appreciate that, with the exception of the packing assemblies and the hold down lock screws described in detail subsequently, the christmas tree assembly 10 is of the type generally known in the prior art, and numerous details with respect to the specific components and the operation of the christmas tree are not detailed herein. It is important to realize at this stage, however, that the sealing assemblies discussed below must be highly reliable and provide the desired seal between the tubular conduit and the equipment component radially outward of each sealing assembly. By reliably providing this sealing relationship, the sealing assemblies as generally shown in FIG. 1 allow components of the christmas tree below the tubing head 36 be maintained at a substantially lower pressure than the pressure within the tubing 20, thereby resulting in substantial cost savings to the operator. Although three sealing assemblies 60 and hold down screws 110 are generally depicted for the christmas tree shown on FIG. 1, those skilled in art will appreciate that any number of sealing assemblies may be used, depending on the configuration of the tree or the downhole equipment.

Figure 2:
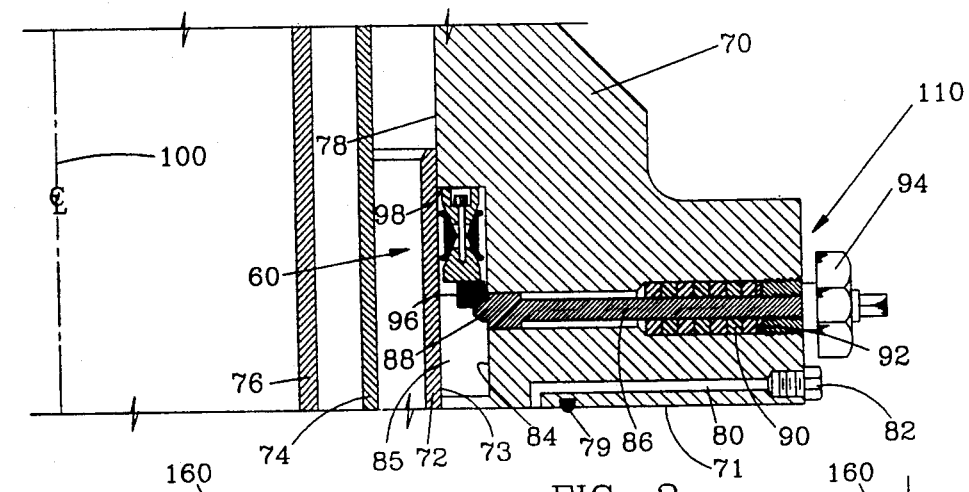
FIG. 2 is a cross-sectional view of a packing assembly, a hold down lock screw, and a portion of a flow conduit head as generally shown in FIG. 1.

FIG. 2 depicts in greater detail a portion of a well flow conduit head 70, which may be considered generic to any of the components 26, 32 or 36 discussed above, to any casing or tubing head, or to any wellhead or downhole equipment having a cylindrical inner surface for sealing engagement with a sealing assembly. The flow conduit head 70 thus has an inner cylindrical surface 78 adapted to receive flow conduit 72, while tubular members 74 and 76 are concentrically aligned with conduit 72 and represent optional casing or tubing strings passing entirely through the head 70. The extreme uppermost end of casing 72 may be in engagement with or adjacent surface 78 as shown in FIG. 2, and a fluid-tight seal between head 70 and casing 72 is formed by the packing assembly 60. The head 70 includes a cylindrical surface 84 having a central axis 100 aligned with surface 78 and each of the casings 72, 74 and 76. The external cylindrical surface 84 (which is actually an interior surface of the head 70) and the internal cylindrical surface 73 (which is actually the outer cylindrical surface of casing 72) thus defined a sleeve-shaped cavity 85 for receiving the packing or sealing assembly 60 described subsequently. The head 70 also includes a stop surface 98 perpendicular with surface 84 for limiting upward movement of the packing assembly 60. A lower planar surface 71 of the head 70 is adapted for engagement with a mating planar surface of related equipment, and an annular O-ring 79 is provided for maintaining the desired sealing relationship between these mating surfaces. An optional packing input passageway 80 may be provided in the head 70, so that plug 82 may be removed and packing occasionally pumped through the passageway 70 and between the mating surfaces to increase the sealing reliability between the mating planar surfaces.

Figure 3:
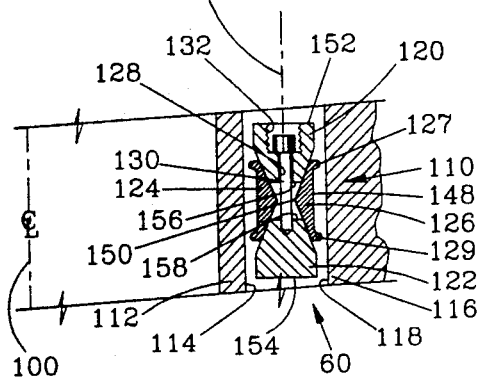
FIG. 3 is an enlarged cross-sectional view of a packing assembly according to the present invention in the un-set position.
Figure 4:
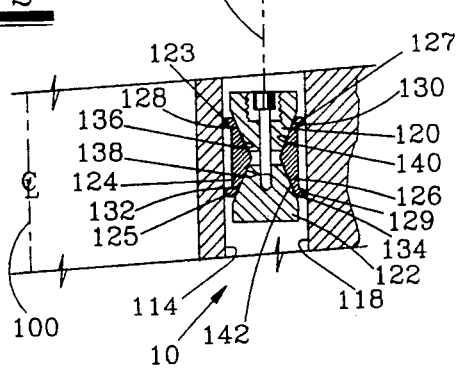
FIG. 4 is an enlarged cross-sectional view of the packing assembly shown in FIG. 3 in the set position.
Figure 5:
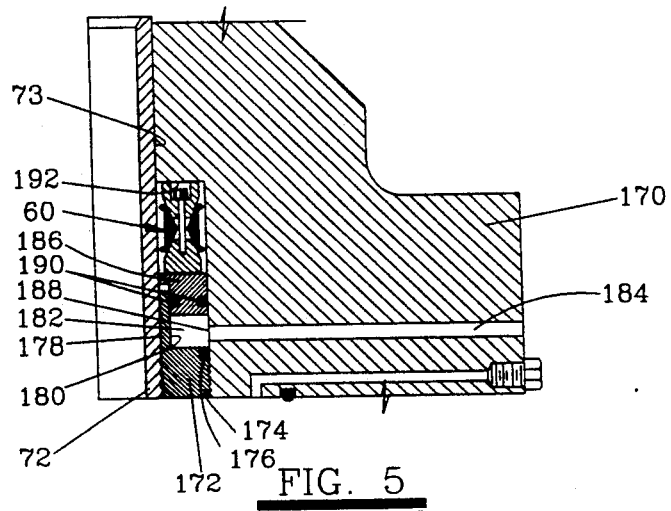
FIG. 5 is a cross-sectional view of a packing assembly, a flow conduit head, and an alternate mechanism for activating the packing assembly in a set position and releasing the packing assembly to an unset position.

FIG. 3 is a more detailed cross-sectional view of the ring-shaped packer assembly 60 generally shown in FIG. 2, and is depicted in its unset position in the annulus between the surface 118 of a head 116 (or similar member), and the surface 114 of a flow conduit 112. Both surfaces 118 and 114 are cylindrical surfaces having a common axis 100. The stop surface 98 as shown in FIG. 2 would typically be provided on member 116 for engaging either the upper or lower end of the packing assembly 60 to prohibit its axial movement within the annulus, but is not shown in FIG. 3. FIG. 4 illustrates the same packing assembly 60 in its set position, such that the packing assembly is in fluid-tight sealing engagement with the surfaces 118 and 114.

Referring to FIGS. 3 and 4, packing assembly 16 comprises an outer seal ring 126 having an upper internal first tapered surface 140 and a lower internal second tapered surface 142, and an inner seal ring 124 having an upper external third tapered surface 136 and a lower external fourth tapered surface 138. The packing assembly further comprises an upper energizing ring 120 having an external fifth tapered surface 130 for sliding engagement with the surface 140, and an internal sixth tapered surface 128 for sliding engagement with the tapered surface 136. A similar lower energizing ring 122 is axially moveable with respect to the upper energizing ring, and has an external seventh tapered surface 134 for sliding engagement with the surface 142 and an internal eighth tapered surface 132 for sliding engagement with the tapered surface 138. Each of these tapered surfaces is angled at substantially the same inclination with respect to axis 160 passing vertically through the center of a cross-section through the ring-shaped packing assembly. While the preferred inclination of each frustoconical tapered surface may depend on the material selected for the seal rings and the energizing rings, and the material which the sealing assembly will engage, this inclination will generally be in the range of from 10° to 18° with respect to a vertical axis passing centrally through a cross-section of the packing assembly.

An interconnection member is provided for restricting movement of the energizing rings with respect to each other to axially directed movement, and for limiting axial movement of the energizing rings away from each other, thereby ensuring that each of the outer and inner seal rings are continually supported between the upper and lower energizing rings. A threaded pocket 133 may be provided through the upper surface 152 of the upper energizing ring 120. The threads of this pocket also provide a connection member for both lowering the packing assembly into a well bore and retrieving the packing assembly to the surface, as explained subsequently. Threaded pocket 133 further serves as a recess for receiving the head of bolt 131, which passes through the passageway 128 in the upper energizing ring 120 and is threaded to the lower energizing ring 122 as shown. To set the packing assembly, the upper energizing ring 120 is moved axially closer to the lower energizing ring 122, thereby raising the head of bolt 131 from its base in the pocket 132, and bringing the opposing surfaces 156 and 158 of the energizing rings 120 and 122 closer together. By axially moving the energizing rings together, the sliding engagement of the tapered surfaces causes the continuous outer seal ring 126 to flex radially outward while the continuous inner seal ring 124 flexes radially inward, until each of these seal rings is brought into sealing engagement with the respective sealing surfaces 118 and 114.

Each of the inner and outer seal rings preferably includes an upper and lower annular projection for obtaining substantially line contact sealing engagement with the sealing surface. The outer seal ring 126 thus includes an upper projection 127 and a lower projection 129, while the inner seal ring includes a similar upper projection 123 and a lower projection 125. A particular feature of the invention is that each of these annular projections are axially aligned with a corresponding tapered surface on the upper and lower energizing rings when the packer assembly is set and in sealing engagement with the inner and outer cylindrical surfaces 114 and 118. This feature of the invention results in a substantially equal radially-directed force being applied to the upper and lower projections of both the inner and outer seal rings, which is not obtained according to the prior art.

Prior to installation of a packing assembly, the diameter of the inner and outer cylindrical sealing surfaces 114 and 118 are thus known or presumed. The cross-sectional width of the components of the packing assembly 60 are sized so that the packing assembly may be easily installed, yet the inner and outer seal rings contracted and expanded, respectively, to form reliable sealing engagement with the sealing surfaces 114 and 116. This deformation of the seal rings is relatively minor and within the elastic deformation range of the metal rings, so that upon actuation the seal rings are not permanently deformed, and thus the packing assembly may be repeatedly set and unset without being replaced. Also, the length of the tapered surfaces on the energizing rings are preferably controlled so that a tapered surface on one energizing ring will always be in engagement with a mating surface on a sealing ring which is radially opposite and at the same axial depth as each of the upper or lower projections when the packing assembly is set, taking into consideration all reasonable tolerance variations and the expansion and contraction characteristics of the metal outer and inner seal rings. The inner and outer tapered surfaces on each of the upper and lower energizing rings also preferably extend axially over a length substantially equal to each other and are at the same axial depth. Accordingly, the upper and lower projections on the inner and outer seal rings are substantially at the same depth when the packing assembly is set for sealing engagement with the inner and outer cylindrical surfaces. This feature of the packing assembly increases sealing reliability since the upper projections and the lower projections on the inner and outer seal rings are at least substantially of the same depth when the packing assembly is set, thereby minimizing torsional or twisting forces on the set packing assembly.

Once the packing assembly 60 is placed into the annulus between the inner and outer sealing surfaces, a lock down screw assembly 110 as shown in FIG. 2 may be used to set the packing assembly. A lock down screw 86 is threaded to a packing gland head 94, and its outwardly extending end provides a convenient means to rotate the lock screw and move the frustoconical end surface 88 radially with respect to the head, thereby raising or lowering ring 96. Packing gland head 94 is threaded to both screw 86 and head 70, and provides a conventional technique for energizing and/or replacing the packing. Packing 90 and metal backup ring 92 provide a reliable seal to insure that high pressure fluid in annulus 85 cannot escape from the port in the head 70 provided for the lock down screw. The lock down screw used to activate and deactivate the sealing assembly 60 is thus similar to prior art lock down screws, and is conventional provided below but may be provided above the packing assembly. The lock down screw 110 may thus be rotated radially inward to set the packing assembly 60 to a position as shown in FIG. 4, and may thereafter be unthreaded from the head 70 to unset or release the packing assembly 60 to the position as shown in FIG. 3. The packing assembly is designed to be a permanent component within the hydrocarbon recovery assembly, and may be repeatedly set and unset, if necessary, yet still reliably seal with the inner and outer cylindrical surfaces.

The packing assembly of the present invention may be easily and quickly installed, either on equipment used at the surface or in subsurface situations. In the latter case, the packing assembly 60 of the present invention has significant advantages, in that the entire assembly 60 may be lowered as a unit into the well bore and placed into service during a single trip, thereby reducing installation costs and downtime. When both lowering a packing assembly into a well bore and when retrieving a packing assembly to the surface, the threads defining pocket 133 in the upper energizing ring provide a connection member for interconnecting the entire packing assembly to a conventional downhole positioning tool. The entire ring-shaped packing assembly 60 may thus be lowered into a well bore and placed over a casing, and the head 70 of the hydrocarbon recovery assembly thereafter placed over the end of the casing and the seal assembly. Alternatively, the head may include a large diameter cylindrical opening so that the seal or packing assembly can be easily installed between the casing and the head, and a radially moveable member thereafter slid into the annulus between the casing and the head to act as a stop during the setting operation. As still a further embodiment, the lock down screw could be provided above the packing assembly, so that a stop surface equivalent to 98 could be fixed to the head but be provided below the packing assembly. If the packing assembly is installed in a substantially deep well or a subsea installation, a hydraulically set mechanism may be used for setting the seal assembly, as explained below. In any case, the components of the wellhead or other hydrocarbon recovery assembly are installed with extreme care. Each component is preferentially checked to insure proper placement and operation with respect to other components prior to installing the next component in the assembly. The present invention provides an inexpensive yet reliable technique to minimize this installation cost and related downtime by allowing the entire packing assembly to be installed with a single trip into the well bore. Regardless of whether the lower energizing ring moves axially upward toward the upper energizing ring or the upper ring moves axially downward toward the lower energizing ring, each energizing ring effectively moves axially with respect to the other energizing ring to set the packing assembly.

FIG. 4 illustrates a hydraulically actuated embodiment of a hydrocarbon recovery assembly according to the present invention, including a packing assembly 60 as previously described. A mandrel 172 is threaded at 174 into engagement with head 170, thereby forming a cavity 182 for receiving a piston 186 axially moveable to press the energizing rings axially together and move the sealing rings into sealed metal-to-metal engagement with the outer cylindrical surface 188 of head 170 and the inner cylindrical surface 73 of casing 72. Mandrel 172 includes an axially extending sleeve portion 178 for sliding engagement with the inner cylindrical wall of the piston 186, while the outer cylindrical piston wall slidingly engages surface 188 of head 170. The O-ring seals 190 on the piston 186 provide dynamic sealing engagement between the piston and these surfaces, while the seal 176 on mandrel 172 provides a desired static seal between the mandrel and the head 170. Head 170 includes a suitable flow path 184 for transmitting high pressure fluid into the cavity 182, so that hydraulic pressure can be used to move the piston 186 axially toward the stop surface 192, thereby setting the seal assembly 60 to the position as shown in FIG. 4. The release of high pressure fluid to the cavity 182 results in the inner and outer seal rings returning to the unset position, as shown in FIG. 3, since the release of the axially directed compressive force on the seal assembly allows the relaxing of the stress forces in the seal rings and energizing rings to return the assembly to the unset position.

Although the interconnection bolt 131 between the energizing rings is shown in each of the depicted figures, it should be understood that suitable bolts 131 are spaced at regular intervals around the circumference of the energizing rings. Typically, from four to eight bolts may be provided for each packing assembly. Also, each port for receiving a bolt head need not be threaded, and a suitable lowering and retrieving tool may typically be adapted for threaded engagement with from two to four threaded pockets 133.

It should be understood that the above description achieves the objects of the present invention, and that various changes may be made without departing from the spirit of the invention. While two projections on each inner and outer seal ring are preferred, additional projections or only a single projection could be provided on each seal ring for obtaining line contact sealing engagement with the respective cylindrical surface. The selected metal for the projections, and thus for the seal rings, is preferably softer than the metal surface which the seal rings will engage, so that these projections (but not the entire seal ring) deform during setting of the packing assembly. In spite of this projection deformation, the packing assembly can be repeatedly set and unset yet achieve reliable sealing engagement as long as the packing assembly is not repositioned within the well bore. The size of the seal assembly as well as the particular cross-sectional configuration of the seal assembly will be determined by the application in which the seal assembly is to be placed.

While the invention has been described in connection with certain preferred embodiments, it should be understood that the disclosure of these embodiments is not intended to limit the invention. On the contrary, the invention is intended to cover various alternatives, modifications, and equivalents which are included within the scope of the invention.

What is claimed is:

1. A packing assembly for hydrocarbon recovery equipment to form a static seal between an outer cylindrical surface on the equipment and a concentric inner cylindrical surface of a conduit passing at least partially through an axial flow path within the equipment for transmitting high pressure fluids, the packing assembly comprising:

an outer seal ring having an upper radially internal first tapered surface and a lower radially internal second tapered surface, the outer seal ring further having an annular outwardly extending projection for substantially line contact static sealing engagement with the outer cylindrical surface on the equipment;

an inner seal ring having an upper radially external third tapered surface and a lower radially external fourth tapered surface, the inner seal ring further having an annular inwardly extending projection for substantially line contact static sealing engagement with the inner cylindrical surface of the conduit;

an upper energizing ring having a radially external fifth tapered surface for sliding engagement with the first tapered surface, and a radially internal sixth tapered surface for sliding engagement with the third tapered surface, the fifth and sixth tapered surfaces each being at substantially the same inclination as the mating first and third tapered surfaces, respectively;

a lower energizing ring axially moveable with respect to the upper energizing ring and having a radially external seventh tapered surface for sliding engagement with the second tapered surface, and a radially internal eighth tapered surface for sliding engagement with the fourth tapered surface, the seventh and eighth tapered surfaces being at substantially the same inclination as the mating second and fourth tapered surfaces, respectively; and an interconnection member for limiting axial movement of the upper energizing ring with respect to the lower energizing ring, such that each of the outer and inner seal rings are supported between the upper and lower energizing rings, and the outer seal ring moves radially outward into sealing engagement with the outer cylindrical surface as the inner seal ring moves radially inward into sealing engagement with the inner cylindrical surface when one of the upper and lower energizing rings moves axially toward the other of the upper and lower rings.

2. The packing assembly as defined in claim 1, further comprising:

the annular projection on the outer seal ring is an upper first projection, and the outer seal ring has an outwardly extending ring-shaped lower second projection for substantially line contact sealing engagement with the outer cylindrical surface;

the annular projection on the inner seal ring is an upper first projection, and the inner seal ring has an inwardly extending ring-shaped lower fourth projection for substantially line contact sealing engagement with the inner cylindrical surface; and each of the first, second, third and fourth projections are radially opposite the fifth, seventh, sixth, and eighth tapered surfaces of the upper and lower energizing rings, respectively, when the outer and inner seal rings are in sealing engagement with the outer and inner cylindrical surfaces.

3. The packing assembly as defined in claim 2, further comprising:

the fifth tapered surface of the upper energizing ring extending axially over a length substantially equal to the sixth tapered surface of the upper energizing ring; and the first and third projections are substantially at the same axial depth when the outer and inner seal rings are in sealing engagement with the outer and inner cylindrical surfaces.

4. The packer assembly as defined in claim 1, further comprising:

a connection member in the upper energizing ring for retrieving the packing assembly to the surface.

5. The packing assembly as defined in claim 4, wherein the connection member is a threaded bore in the upper energizing ring.

6. The packing means as defined in claim 1, wherein each of the first, second, third and fourth tapered surfaces of the outer and inner seal rings are angled at substantially the same inclination with respect to a vertical axis passing centrally through a cross-section of the packing assembly.

7. The packing assembly as defined in claim 6, wherein each of first, second, third and fourth surfaces are angled at from 10° to 18° with respect to the vertical axis passing centrally through a cross-section of the packing assembly.

8. The packing assembly as defined in claim 1, wherein the interconnection member is a bolt for threaded engagement with at least one of the upper and lower energizing rings.

9. A hydrocarbon recovery assembly, comprising:

a flow conduit head having an outer cylindrical surface;

a flow conduit extending into the flow conduit head and having an inner cylindrical surface spaced within the outer cylindrical surface;

a packing assembly positioned radially between the outer and inner cylindrical surfaces, including an outer seal member having an upper radially internal first tapered surface, a lower radially internal second tapered surface, and at least one outwardly extending annular projection for substantially line contact static sealing engagement with the outer cylindrical surface of the flow conduit head; an inner seal member having an upper radially external third tapered surface, a lower radially external fourth tapered surface, and at least one inwardly extending annular projection for substantially line contact static sealing engagement with the inner cylindrical surface of the flow conduit; an upper energizing ring having a radially external fifth tapered surface for sliding engagement with the first tapered surface and a radially internal sixth tapered surface for sliding engagement with the third tapered surface, the fifth and sixth tapered surfaces each being at substantially the same inclination as the mating first and third tapered surfaces, respectively; and a lower energizing ring axially moveable with respect to the upper energizing ring and having a radially external seventh tapered surface for sliding engagement with the second tapered surface and a radially eighth tapered surface for sliding engagement with the fourth tapered surface, the seventh and eight tapered surfaces being at substantially the same inclination as the mating second and fourth tapered surfaces, respectively;

an interconnection member for limiting axial movement of the upper energizing ring with respect to the lower energizing ring, such that the outer seal ring and the inner seal ring are continually supported between the upper and lower energizing rings; and a compression member moveable with respect to the flow conduit head for effecting axial movement of one of the upper and lower energizing rings with respect to the other of the upper and lower energizing rings such that the outer seal ring and inner seal ring are forced radially into sealing engagement with the outer cylindrical surface of the flow conduit head and the inner cylindrical surface of the flow conduit, respectively.

10. The hydrocarbon recovery assembly as defined in claim 9, further comprising:

the at least one outwardly extending annular projection on the outer seal ring includes an outwardly extending upper ring-shaped first projection for substantially line contact sealing engagement with the outer cylindrical surface of the flow conduit head and an outwardly extending ring-shaped lower second projection for substantially line contact sealing engagement with the outer cylindrical surface of the flow conduit head;

the at least one inwardly extending annular projection on the inner seal ring includes an inwardly extending upper ring-shaped upper third projection for substantially line contact sealing engagement with the inner cylindrical surface of the flow conduit and an inwardly extending ring-shaped lower fourth projection for substantially line contact sealing engagement with the inner cylindrical surface of the flow conduit; and each of the first, second, third and fourth projections are radially opposite the fifth, seventh, sixth and eighth tapered surfaces of the upper and lower energizing rings, respectively, when the outer and inner seal rings are in sealing engagement with flow conduit head and the flow conduit.

11. The hydrocarbon recovery assembly as defined in claim 10, further comprising:

the fifth tapered surface of the upper energizing ring extending axially over a length substantially equal to the sixth tapered surface of the upper energizing ring; and the first and third projections are substantially at the same axial depth when the outer and inner seal rings are in sealing engagement with the outer and inner cylindrical surfaces.

12. The hydrocarbon recovery assembly as defined in claim 9, wherein each of the first, second, third and fourth tapered surfaces of the outer and inner seal rings are angled at substantially the same inclination with respect to a vertical axis passing centrally through a cross-section of the packing assembly.

13. The hydrocarbon recovery assembly as defined in claim 9, wherein the compression member comprises:

a lock screw threadably connected to the flow conduit head for effecting axial movement of the one energizing ring with respect to the other energizing ring.

14. The hydrocarbon recovery assembly as defined in claim 9, wherein the compression member comprises:

a piston axially moveable with respect to the flow conduit head for effecting axial movement of the one energizing ring with respect to the other energizing ring; and a fluid flow path within the flow conduit head for transmitting pressurized fluid into engagement with the piston.

15. A method of forming, positioning and setting a packing assembly in downhole equipment for static sealing between an outer cylindrical surface on the equipment and an inner cylindrical surface on a tubular member, the method comprising:

forming an outer seal ring having an upper radially internal first tapered surface, a lower radially internal second tapered surface, and at least one outwardly extending annular projection for substantially line contact static sealing engagement with the outer cylindrical surface on the equipment;

forming an inner seal ring having an upper radially external third tapered surface, a lower radially external fourth tapered surface, and at least one inwardly extending annular projection for substantially line contact static sealing engagement with the inner cylindrical surface on the tubular member;

forming an upper energizing ring having a radially external fifth tapered surface and a radially internal sixth tapered surface at substantially the same inclination as the first and third tapered surfaces, respectively;

forming a lower energizing ring having a radially external seventh tapered surface and a radially internal eighth tapered surface at substantially the same inclination as the second and fourth tapered surfaces, respectively;

positioning the outer seal ring with respect to the upper and lower energizing rings such that the first and second tapered surfaces are in sliding engagement with the fifth and seventh tapered surfaces, respectively;

positioning the inner ring with respect to the upper and lower energizing rings such that the third and fourth tapered surfaces are in sliding engagement with the sixth and eighth tapered surfaces, respectively;

mechanically connecting the upper and lower energizing rings for limiting axial movement of the upper energizing ring away from the lower energizing ring, while permitting axial movement of the upper energizing ring toward the lower energizing ring;

lowering the outer seal ring, the inner seal ring, the upper energizing ring, and the lower energizing ring as an assembly downhole to a positionable between the outer cylindrical surface on the equipment and the inner cylindrical surface on the tubular member; and thereafter axially moving the upper energizing ring with respect to the lower energizing ring to force the outer seal ring radially outward into sealing engagement with the outer cylindrical surface and simultaneously force the inner seal ring radially inward into sealing engagement with the inner cylindrical surface.

16. The method as defined in claim 15, further comprising:

the step of forming the outer seal ring including the at least one outwardly extending projection comprises providing an outwardly extending ring-shaped upper first projection on the outer seal ring for substantially line contact sealing engagement with the outer cylindrical surface and an outwardly extending ring-shaped lower second projection on the outer seal ring for substantially line contact sealing engagement with the outer cylindrical surface;

the step of forming the inner seal ring including the at least one inwardly extending projection comprises providing an inwardly extending ring-shaped upper third projection on the inner seal ring for substantially line contact sealing engagement with the inner cylindrical surface and an inwardly extending ring-shaped lower fourth projection on the inner sealing for substantially line contact sealing engagement with the inner cylindrical surface; and positioning each of the first, second, third and fourth projections radially opposite the fifth, seventh, sixth and eighth tapered surfaces of the upper and lower energizing rings, respectively, when the packing assembly is in sealing engagement with the outer and inner cylindrical surfaces.

17. The method as defined in claim 16, further comprising:

forming the fifth tapered surface on the upper energizing ring axially over a length substantially equal to the sixth tapered surface on the upper energizing ring; and positioning the first and third projections at substantially the same axial depth when the outer and inner seal rings are in sealing engagement with the outer and inner cylindrical surfaces.

18. The method as defined in claim 15, further comprising:

forming a connection member on the upper energizing ring for lowering the packing assembly downhole and retrieving the packing assembly to the surface.

19. The method as defined in claim 15, further comprising:

forming each of first, second, third and fourth surfaces at an angle of from 10° to 18° with respect to a vertical axis passing centrally through a cross-section of the packing assembly.

* * * * *

UNITED STATES PATENT AND TRADEMARK OFFICE
CERTIFICATE OF CORRECTION

PATENT NO. : 5,114,158

DATED : May 19, 1992

INVENTOR(S) : Tri C. Le

It is certified that error appears in the above-identified patent and that said Letters Patent is hereby corrected as shown below:

In Column 14, line 39, change "positionable" to --position--.

Signed and Sealed this

Seventh Day of September, 1993

Attest:

BRUCE LEHMAN

*Attesting Officer*  *Commissioner of Patents and Trademarks*